United States Patent
Hummel et al.

(10) Patent No.: US 9,291,222 B2
(45) Date of Patent: Mar. 22, 2016

(54) BRAKE DUST COLLECTOR FOR MOTOR VEHICLES

(71) Applicant: MANN+HUMMEL GMBH, Ludwigsburg (DE)

(72) Inventors: Karl-Ernst Hummel, Bietigheim-Bissingen (DE); Andreas Beck, Kirchheim (DE); Bernhard Huurdeman, Freiberg (DE); Ulrich Dehnen, Kornwestheim (DE)

(73) Assignee: MANN+HUMMEL GMBH, Ludwigsburg (DE)

( * ) Notice: Subject to any disclaimer, the term of this patent is extended or adjusted under 35 U.S.C. 154(b) by 0 days.

(21) Appl. No.: 14/010,915

(22) Filed: Aug. 27, 2013

(65) Prior Publication Data

US 2014/0054121 A1 Feb. 27, 2014

(30) Foreign Application Priority Data

Aug. 27, 2012 (DE) .......................... 10 2012 016 835

(51) Int. Cl.
*F16D 65/00* (2006.01)
(52) U.S. Cl.
CPC ................................. *F16D 65/0031* (2013.01)

(58) Field of Classification Search
CPC ..................................................... F16D 65/0031
USPC ....................................................... 188/218 A
See application file for complete search history.

(56) References Cited

U.S. PATENT DOCUMENTS

| 5,035,304 A * | 7/1991 | Bosch .......................... 188/71.1 |
| 5,671,827 A * | 9/1997 | Demetriou et al. .......... 188/71.6 |
| 6,155,650 A * | 12/2000 | Barger ........................... 301/6.3 |
| 2008/0029357 A1* | 2/2008 | Krantz ...................... 188/218 A |
| 2010/0065387 A1* | 3/2010 | Tsiberidis ................. 188/218 A |

FOREIGN PATENT DOCUMENTS

DE 02009021203 A1 1/2010

* cited by examiner

*Primary Examiner* — Robert A Siconolfi
*Assistant Examiner* — Charles Poon
(74) *Attorney, Agent, or Firm* — James Hasselbeck

(57) ABSTRACT

A brake dust collector for a motor vehicles for collecting brake dust has a dust collecting device with a filter element and a filter receptacle in which the filter element is arranged. The filter element is a shaped filter and has at least two partial sections. The at least two partial sections each have a filter material of a different porosity including a first partial section with a great porosity and a second partial section with a small porosity.

15 Claims, 5 Drawing Sheets

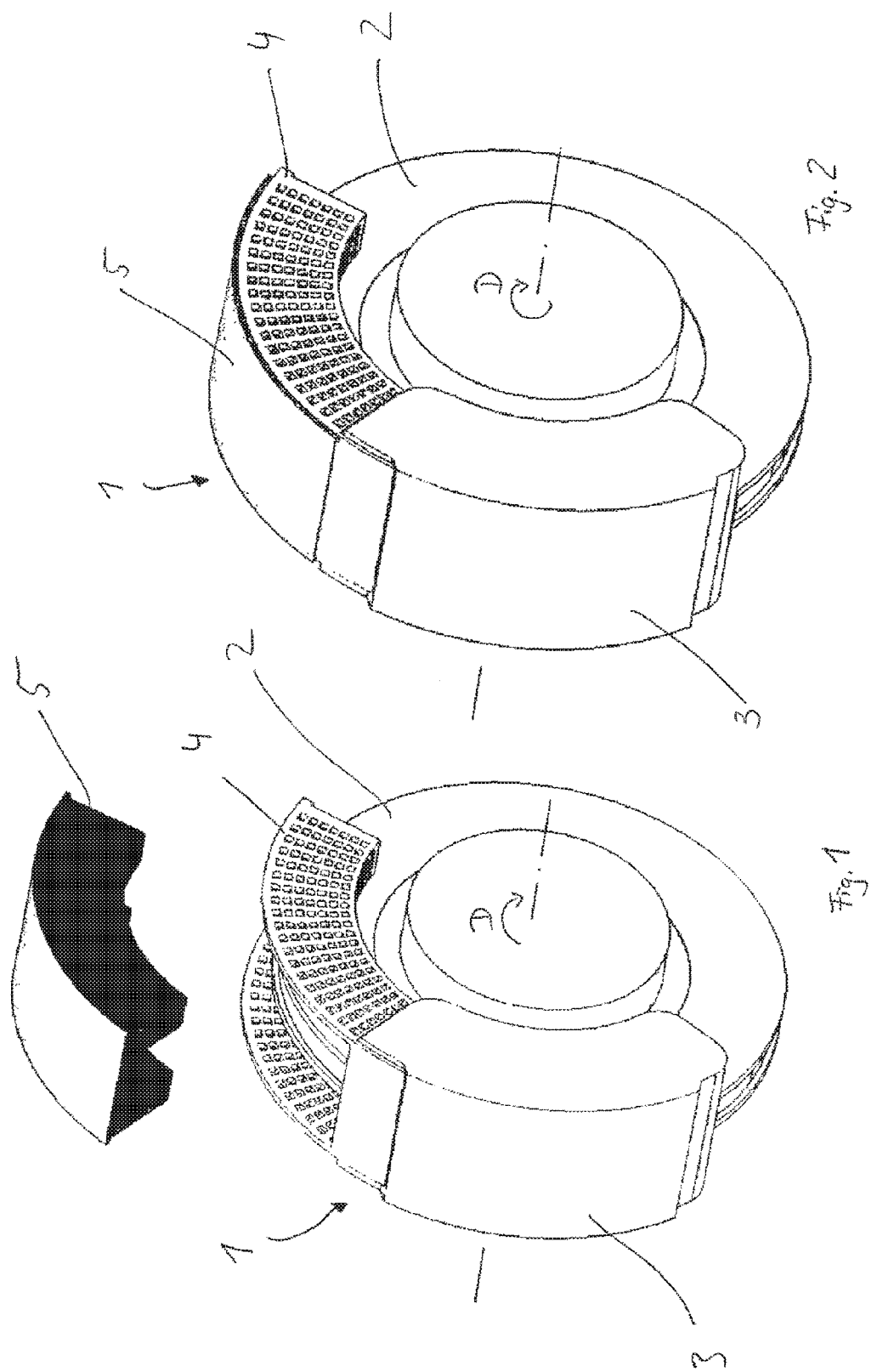

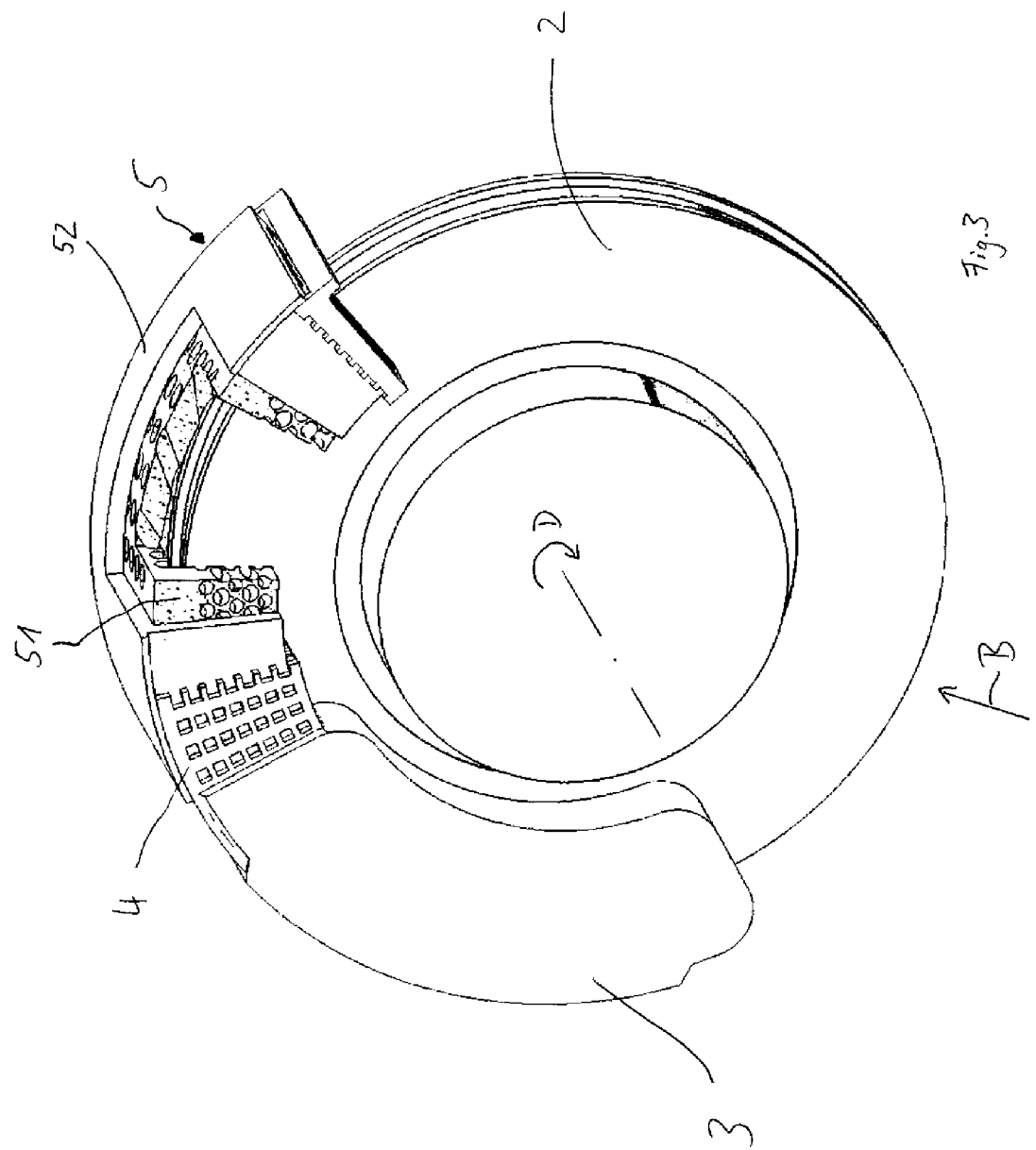

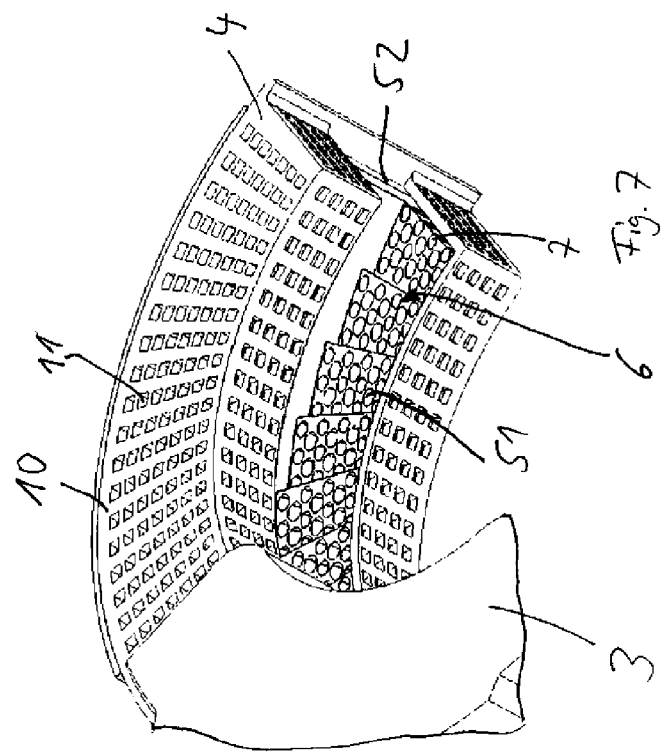
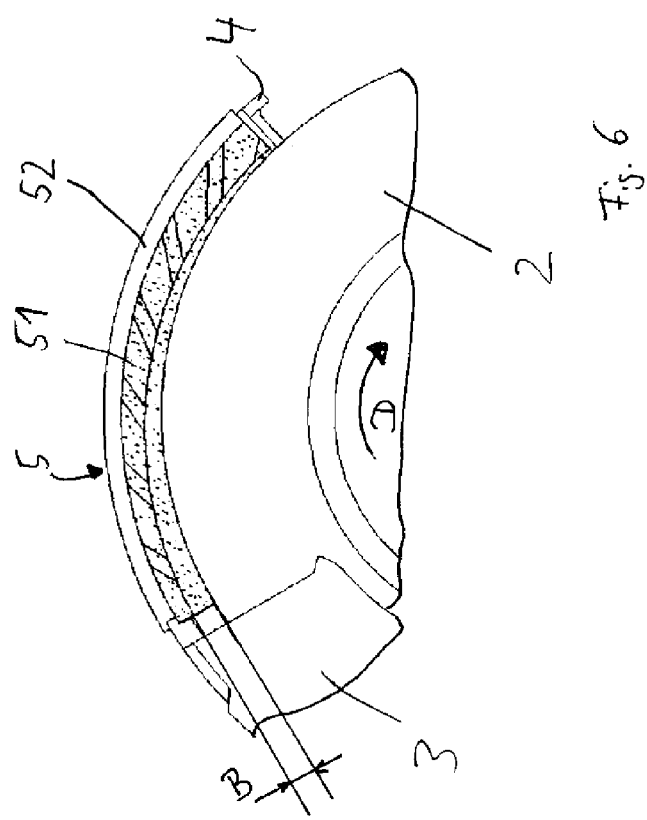

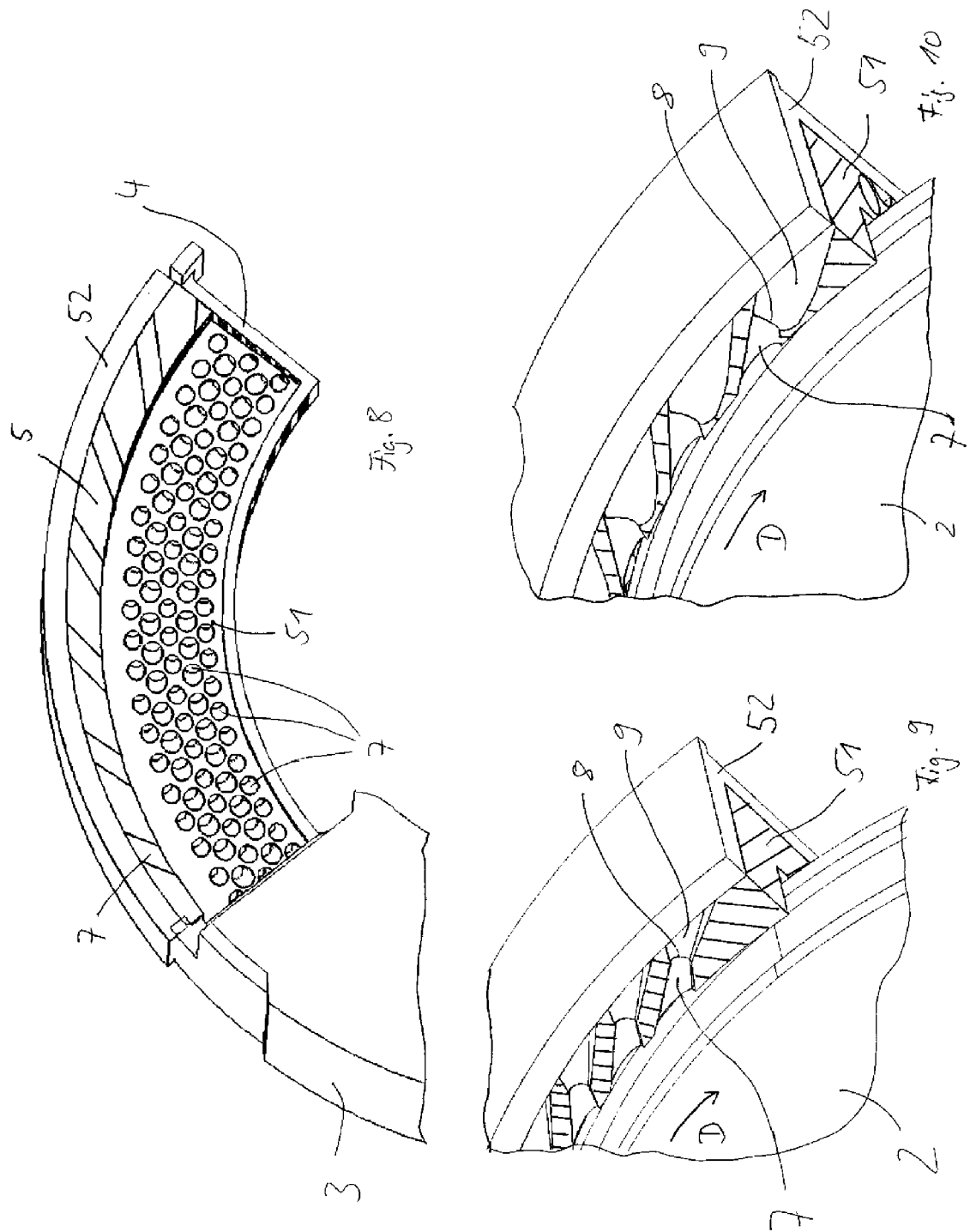

BRAKE DUST COLLECTOR FOR MOTOR VEHICLES

CROSS REFERENCE TO RELATED APPLICATIONS

This application claims a priority date of Aug. 27, 2012, based on prior filed German patent application No. 10 2012 016 835.7, the entire contents of the aforesaid German patent application being incorporated herein by reference.

BACKGROUND OF THE INVENTION

The invention concerns a brake dust collector for motor vehicles for collecting brake dust in a dust collecting device that comprises a filter element and a filter element receptacle.

DE 10 2009 021 203 A1 discloses a brake dust collector for motor vehicles that serves for receiving brake dust of a vehicle wheel brake. The brake dust that is produced during braking is guided to a dust collecting device that is embodied as a filter element which is arranged at the radial outer edge of the brake disk and is extending across a defined angle section of the brake disk. The produced brake dust is exclusively accelerated by the rotational movement of the brake disk or by flows across the brake disk in the direction of the filter element where it is collected.

According to a variant described in DE 10 2009 021 203 A1, the filter element is received in a filter housing that serves for safely housing the filter element as well as for fastening on the brake caliper. The filter housing surrounds the U-shaped filter element that is placed onto the brake disk and forms together with the filter element a constructive unit which must be exchanged as a whole for service and maintenance purposes.

EP 2 102 522 B1 discloses a brake dust collector for a wheel disk brake in which a housing covers a section of the brake disk; in the housing, a brake dust retaining device with several brake dust inlet openings is provided.

The invention has the object to provide with simple constructive measures an efficient and service-friendly brake dust collector for a brake system of a vehicle and a filter element that can be arranged in the brake dust collector.

SUMMARY OF THE INVENTION

In accordance with the present invention, this is achieved in that the filter element is a shaped filter, wherein the shaped filter has at least two partial sections, wherein the partial sections have different porosities of the filter material.

The invention is further directed to a filter element for collecting brake dust that is adapted to be arranged in a brake dust collector as defined and claimed herein.

The brake dust collector according to the invention can be used in motor vehicles for collecting brake dust that is produced upon actuation of the wheel brake.

The filter element has at least one partial section with great porosity and one partial section with small porosity.

The wall surfaces of the filter element perpendicular to the axis of rotation of the brake disk are designed to taper conically in the rotational direction of the brake disk.

The wall surfaces of the filter element perpendicular to the axis of rotation of the brake disk are designed across segments thereof to be of a conical or of a step configuration in the rotational direction of the brake disk.

The filter element has cylindrical recesses and/or passages.

The filter element has recesses and/or passages wherein the recesses and/or passages have a constriction.

The filter element is embodied as a shaped filter and has at least two partial sections wherein the partial sections of the filter element are comprised of sintered metal, ceramic material, or metal.

It is proposed according to the invention to collect the brake dust which is produced in a disk brake between the brake pad and the brake disk and to dispose of it. For this purpose, a shaped filter element is arranged in a filter element receptacle on the brake caliper such that the filter element surrounds the brake disk where the brake disk is exiting from the brake caliper at a minimal spacing within a limited area laterally and within a limited area peripherally. For this purpose, the filter element has advantageously a U-shaped configuration. The filter element receptacle can be attached to the brake caliper or/and a support structure of the vehicle suspension. The filter element is configured as a shaped filter, i.e., it does not comprise a folded filter medium but is made of a shape-stable material such that it assumes the shape that is required for its use. For example, the shaped filter element is comprised of a foam or a ceramic material.

The particles that are escaping between brake pad and brake disk are conveyed by the air flow that is caused by the brake disk and transported into the shaped filter and are caught and collected therein.

According to the invention, the shaped filter element has at least two partial sections which have different porosity. Different porosity is to be understood in this context such that the pore diameter of the pores in the first partial section is greater than the pore diameter of the pores in the second partial section. The shaped filter element can be monolithic or can be produced of at least two individual parts. The individual parts can be comprised of different material and/or can have different porosities.

The part that is facing the brake disk has advantageously a greater porosity and the part that is facing the environment has a smaller porosity. In this way, larger particles can be caught directly and immediately in the area of greater porosity while finer particles are separated in the area of smaller porosity.

In an advantageous embodiment, the porous partial sections of the filter element are comprised of sintered metal, ceramic material, or metal.

The lateral wall surfaces of the filter element that are facing the brake disk extend in an advantageous embodiment perpendicular to the axis of rotation of the brake disk on either side of the brake disk in the rotational direction of the brake disk so as to taper conically, i.e., near the brake caliper where a brake disk segment enters a filter element, the wall surfaces have a greater spacing to the lateral surfaces of the brake disk than at the exit side where the brake disk segment exits from the filter element. In the rotational direction of the brake disk, the width of the gap between the brake disk and the wall surface of the filter element therefore decreases.

Based on the design of the wall surfaces of the filter element, the gap between the axial end faces of the brake disc and the corresponding wall surfaces of the filter element as well as the gap between the radial outer surface of the brake disk and the corresponding wall surface can be designed freely. The course of the width of the gap between the different surfaces can be different but can also be symmetrical on both end faces of the brake disk.

The wall surfaces of the filter element advantageously can be designed conically across segments thereof. Alternatively, a stepped planar configuration of the wall surfaces for forming different gap widths may be advantageous.

In a further embodiment, additionally the wall surfaces of the filter element in radial direction of the brake disk can be designed such that in circumferential direction of the brake disk a conical gap is produced so that in the rotational direction of the brake disk a gap that tapers results. By means of a narrow gap between filter element and circumferential surface of the brake disk at the "exit" of the brake disk from the filter element, a sealing action can be effected such that as few as possible of the particles will be entrained by the rotating brake disk and removed from the brake dust collector and transported into the environment.

In the partial area of the filter element that has greater porosity and that is facing the brake disk, on the lateral wall surfaces as well as in the wall surface preferably cylinder-shaped recesses are provided for separating or collecting (storing) the brake dust; such recesses are arranged in the wall surface above the brake disk preferably in a tangential basic orientation and in the lateral wall surface in the rotational direction or, alternatively, at an angle from a greater radius to a smaller radius according to a further embodiment. Accordingly, a greater separating surface area and a better retention efficiency are obtained. Without these recesses, the particles would rebound more strongly on a closed wall surface and would be collected or stored only to a limited extent.

In a special embodiment, these recesses are formed so as to taper conical toward a constriction and to widen again at the opposite side of the constriction. In this way, additional space is provided from which the particles can hardly escape. Rebound of the particles and escape from the filter are thus prevented in an effective way.

A combination of the illustrated embodiments and arrangements of the filter elements can be advantageously employed, depending on the application and space conditions.

All proposed embodiments can be arranged individually or in any combination with each other.

BRIEF DESCRIPTION OF THE DRAWINGS

FIG. 1 shows a brake dust collector on a brake disk of a wheel brake with removed filter element.

FIG. 2 shows a brake dust collector on a brake disk of a wheel brake with inserted filter element.

FIG. 3 shows a section illustration of the filter element receptacle and of the shaped filter element.

FIG. 6 is a section of the filter element parallel to the end face of the brake disk.

FIG. 7 is an isometric view of a filter element with stepped, offset wall surface.

FIG. 8 is a view of the filter element with recesses.

FIG. 9 is a detail view of recesses that conically taper toward a constriction.

FIG. 10 is a detail view of the recesses with a constriction and a chamber.

DESCRIPTION OF THE PREFERRED EMBODIMENTS

Figure 5:
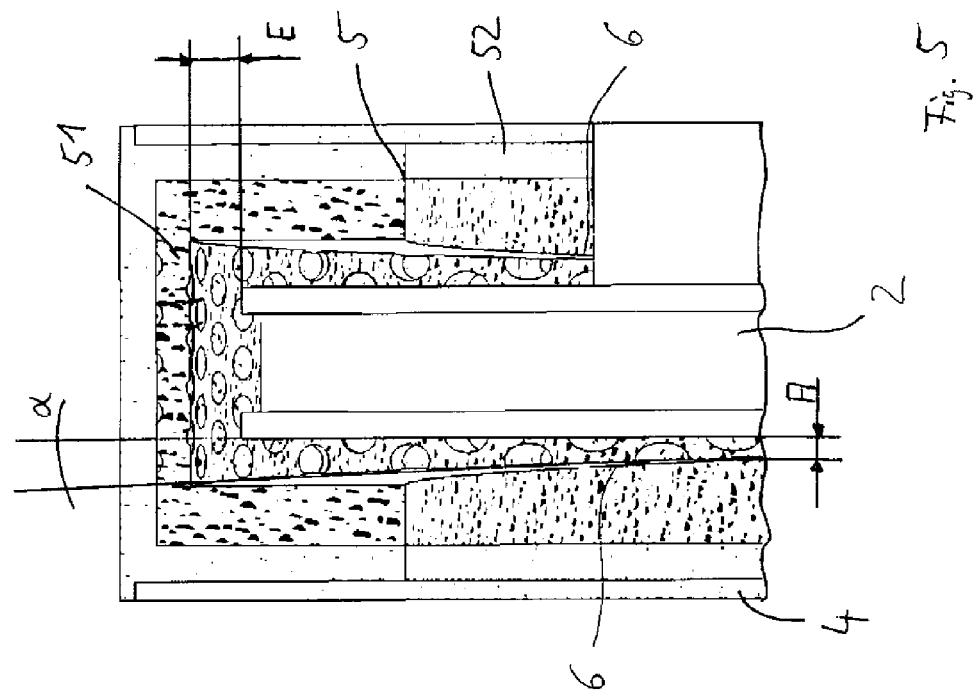
FIG. 5 is an enlarged detail of the brake dust collector in the same view as in FIG. 4.

In FIG. 1, a brake dust collector 1 arranged on a brake disk 2 is shown. On a brake caliper 3 a filter element receptacle 4 is arranged into which a shaped filter element 5 can be inserted. For service purposes, the filter element 5 can be removed and replaced with a new shaped filter element. The brake dust collector 1 is expediently arranged in the rotational direction D of the brake disk 2 downstream of the brake caliper 3 so that upon braking action the brake dust particles that are produced are moving in the direction of the brake dust collector 1 and are collected in the filter element 5.

The assembly of the brake caliper 3 and receptacle 4 with inserted shaped filter element 5 is illustrated in FIG. 2.

FIG. 3 shows a section illustration of the filter element receptacle 4 and of the shaped filter element 5. The filter element 5 is comprised of two partial sections 51, 52. The brake disk-near partial section 51 has a coarse porosity (large pores) and the brake disk-remote partial section 52 has a small porosity (small pores). Both partial sections 51, 52 are inserted into the filter element receptacle 4. The partial sections 51, 52 can be designed monolithically as a shaped filter element 5 or can be comprised of two individual shaped filter element parts that are inserted into the receptacle 4. The filter element receptacle 4 in the rotational direction of the brake disk 2 upon forward travel of the vehicle is arranged downstream or behind the brake caliper 3. The filter element receptacle 4 can be mounted on the brake caliper 3 or/and on a support structure of the vehicle suspension. Illustrated is an internally vented brake disk 2 in which the air during movement of the brake disk 2 flows between the exterior sides through the interior.

Figure 4:
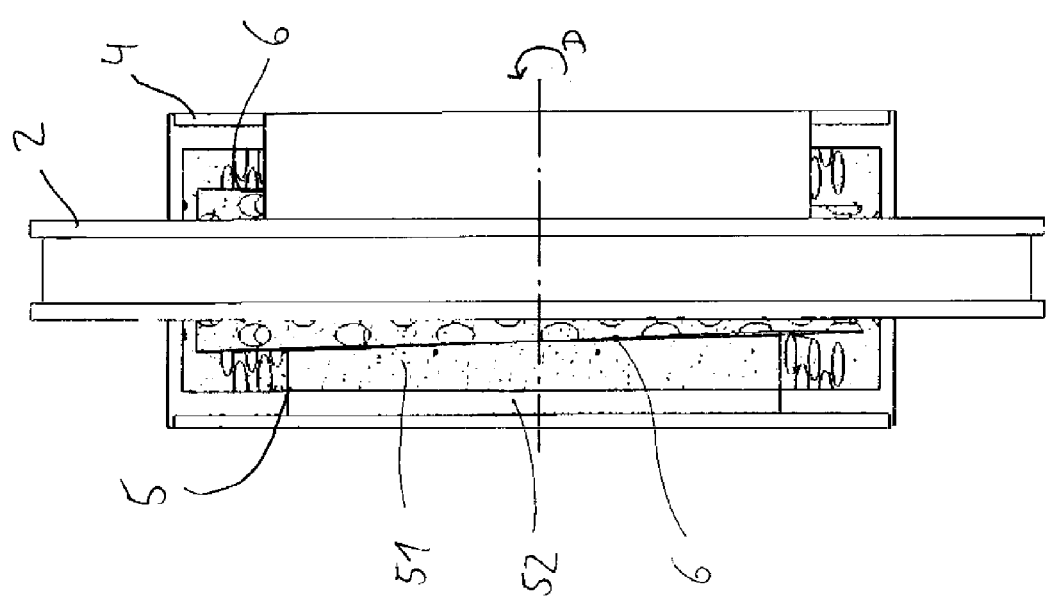
FIG. 4 is a view from the center of the brake disk in outward, radial direction.

In a view from the viewing direction B (FIG. 3) of the brake disk 2, FIG. 4 shows, in radial direction outwardly relative to the brake disk 2, a filter element 5 with two partial sections 51 and 52 of different porosity, inserted into filter element receptacle 4. The brake caliper 3 is not illustrated so as not to crowd the drawing. The partial section 51 which is positioned proximal to the brake disk 2 has a conical course of the wall surface 6 viewed in the direction of circulation of the brake disk upon rotation of the brake disk in rotational direction D about the center axis so that, in the movement direction of the brake disk 2 within the filter element 5, the gap between filter element 5 and the brake disk 2 tapers in the area of the filter element 5. The gap can be symmetrical on both sides of the brake disk 2. Alternatively, a different configuration of the gaps on the opposite sides of the brake disk 2 is possible. When entering the gap, the air resistance is thus minimal and the air can flow easily into the gap. The partial section 51 with great porosity is surrounded in the illustration of FIG. 4 on the side that is facing away from the brake disk 2 with a partial section 52 of smaller porosity in order to filter from the air, after a first coarse filtration by means of the partial section 51, the smaller particles by a fine separation.

FIG. 5 shows a detail view of the brake dust collector in the same view as in FIG. 4. The gap between the brake disk 2 and the filter material of the filter element 5 is shown. The filter material of the filter element 5 has a spacing A relative to the lateral surface of the brake disk 2 and a spacing E relative to the circumferential surface of the brake disk 2. The spacing A extends at an angle α conically to the lateral surface of the brake disk 2 and decreases in the circumferential direction of the brake disk 2. The spacing A as well as the spacing E can change in the circumferential direction of the brake disk 2. The angle α can be different on the two end faces of the brake disk 2 and can change in the circumferential direction.

FIG. 6 shows a section of the filter element 5 parallel to the end face of the brake disk 2. Illustrated is the radial spacing B between the circumferential surface of the brake disk 2 and the filter element 5; the radial spacing B tapers in the rotational direction D of the brake disk 2. As a result of the U-shape of the filter element 5, the lateral wall surface of the partial area 51 behind the brake disk 2 can be seen. The partial section 51 of the filter element 5 with greater porosity is facing the brake disk 2. The partial section 52 is arranged in radial direction outwardly on the partial section 51.

FIG. 7, like FIG. 8, shows a perspective view of the filter element 5 in the filter element receptacle 4 mounted on the brake caliper 3. The brake disk 2 is not illustrated so as not to crowd the drawing. The wall surface 6 of the filter element 5 has a stepped configuration provided in the partial section 51 that is facing the brake disk 2. A stepped change of the free cross-section between brake disk 2 and filter element 5 is effected by the design of the wall surface 6 with steps with parallel surfaces relative to the brake disk 2 or by conically angled stepped surfaces. A stepped configuration of the wall surface is of course possible also for the wall surface of the filter element 5 at a radial spacing to the brake disk 2.

For improving the separating efficiency of the brake dust collector 1, passages 11 are arranged in the wall 10 of the filter element receptacle 4 and provide an optimized flow through the filter element 5.

A perspective view of the filter element 5 and of the brake caliper 3 without brake disk 2 in a section through the filter element 5 is shown in FIG. 8. The filter element 5 has a plurality of recesses or passages 7. The recesses 7 are preferably cylindrical passages which are arranged in the wall surface 6 in the area of the brake disk 2. Preferably, the recesses are arranged in a basic tangential orientation relative to the brake disk 2 or are extending at an angle from a greater radius to a smaller radius (not illustrated). In this way, a greater separating surface and/or an improved retaining efficiency for the separated particles results. Due to the recesses, it is prevented that the particles collected by the filter element are again entrained and carried off by the airflow and emitted into the environment. Without the recesses there is the risk that the particles will rebound on the wall surface 6 or will be collected only to a limited extent within the filter element.

FIGS. 9 and 10 show particular embodiments of the recesses 7 in the filter element 5. The recesses 7 according to FIG. 9 show a passage that extends conically to a constriction 8 and that, in tangential direction to the circumference of the brake disk 2, then widens again conically behind the constriction 8 to a chamber 9.

FIG. 10 shows recesses 7 which taper to a constriction 8, then widen again behind the constriction 8 in the tangential direction to the circumference of the brake disk 2 and form a chamber 9 from which the particles cannot return in the direction toward the brake disk 2 or the environment.

While specific embodiments of the invention have been shown and described in detail to illustrate the inventive principles, it will be understood that the invention may be embodied otherwise without departing from such principles.

What is claimed is:

1. A brake dust collector for a motor vehicle for collecting brake dust, the brake dust collector comprising:
   a dust collecting device comprising a filter element and a filter receptacle, wherein the filter element is arranged in the filter element receptacle;
   wherein the filter element is a U-shaped filter having a U-shaped cross-section;
   wherein the U-shaped filter has at least two partial sections, the at least two partial sections including:
      a U-shaped first partial section of a filter material of a first porosity, the first partial section of the filter having a first leg, a second leg, and a to section connecting the first and second legs to form a continuous U-shaped cross section of filter material, the first partial section configured to receive portion a brake disk into a U-shaped interior of the first partial section;
      a U-shaped second partial section of filter material of a second porosity, the second partial section having a first leg, a second leg and a to section connecting the first and second legs to form a U-shaped cross section;
   wherein the first partial section is arranged within a U-shaped interior of the second partial section such that first leg, second leg and the to section of the second partial section overlay respective ones of first leg, second leg and the top section of the first partial section;
   wherein the at least two partial sections each have a filter material of a different porosity.

2. The brake dust collector according to claim 1, wherein the first partial section has great porosity and the second partial section has smaller porosity than the first partial section.

3. The brake dust collector according to claim 1, wherein wall surfaces of the filter element that are extending perpendicular to an axis of rotation of the brake disk taper conically in a rotational direction of the brake disk.

4. The brake dust collector according to claim 1, wherein wall surfaces of the filter element that are extending perpendicular to the axis of rotation of the brake disk form conically shaped segments in a rotational direction of the brake disk.

5. The brake dust collector according to claim 1, wherein wall surfaces of the filter element that are extending perpendicular to the axis of rotation of the brake disk having a plurality of wall surface segments arranged in a stepped configuration in a rotational direction of the brake disk.

6. The brake dust collector according to claim 1, wherein the first partial section of the filter element has recesses.

7. The brake dust collector according to claim 6, wherein the filter receptacle has passages.

8. The brake dust collector according to claim 6, wherein the recesses are cylindrical and have a constriction.

9. The brake dust collector according to claim 1, wherein the first partial section of the filter element has passages extending completely through the first partial section from an inner wall of the first partial section to an outer wall of the first partial section.

10. The brake dust collector according to claim 9, wherein the passages extend from a first passage end to a second passage end, the first passage end at the inner wall of the first partial section, the second passage end at the outer wall of the first partial section;
   wherein the first partial section passages narrow to a constriction, the constriction arranged between the first passage end and the second passage end.

11. The brake dust collector according to claim 1, wherein at least one of the at least two partial sections is made of sintered metal, ceramic material, or metal;
   wherein the first partial section has great porosity and the second partial section has a smaller porosity than the first partial section.

12. The brake dust collector according to claim 11, wherein the first partial section of the filter element has passages extending completely through the first partial section from an inner wall of the first partial section to an outer wall of the first partial section;
   wherein the passages extend from a first passage end to a second passage end, the first passage end at the an inner wall of the first partial section, the second passage end at the outer wall of the first partial section;
   wherein the first partial section passages narrow to a constriction, the constriction arranged between the first passage end and the second passage end.

13. The brake dust collector according to claim 12, wherein
wall surfaces of the filter element that are extending perpendicular to the axis of rotation of the brake disk having a plurality of wall surface segments arranged in a stepped configuration in a rotational direction of the brake disk.

14. A filter element for collecting brake dust, comprising:
a U-shaped filter having a U-shaped cross-section;
wherein the shaped U-shaped filter has at least two partial sections, the at least two partial sections including:
   a U-shaped first partial section of a filter material of a first porosity, the first partial section of the filter having a first leg, a second leg, and a to section connecting the first and second legs to form a continuous U-shaped cross section of filter material, the first partial section, when installed, is configured to receive portion a brake disk into a U-shaped interior of the first partial section;
   a U-shaped second partial section of a second filter material of a second porosity, the second partial section having a first leg, a second leg and a to section connecting the first and second legs to form a U-shaped cross section;
   wherein the first partial section is arranged within a U-shaped interior of the second partial section such that first leg, second leg and the to section of the second partial section overlay respective ones of first leg, second leg and the top section of the first partial section;
wherein the at least two partial sections each have a filter material of a different porosity;
wherein the filter element is configured and adapted to be received in a brake dust collector according to claim 1.

15. The filter element according to claim 14, wherein
at least one of the at least two partial sections is made of sintered metal, ceramic material, or metal.

* * * * *